Patented Jan. 1, 1946

2,392,241

UNITED STATES PATENT OFFICE 2,392,241

PROCESS OF PRODUCING DRIED TOMATO PRODUCT

Elmer F. Glabe, Chicago, Ill., assignor, by mesne assignments, to Stein, Hall & Co., Inc., a corporation of New York No Drawing. Application May 14, 1941, Serial No. 393,369

6 Claims. (Cl. 99—206)

This invention relates to dried food products and more particularly to a new and improved dried tomato product. The invention is especially concerned with the preparation of a dried tomato product in a powdery, or substantially non-hydroscopic state, from which it may be readily dispersed in water to form a soup.

Although many dried foods are well known, the preparation of certain types of dried foods suitable for soups, such as tomatoes, has presented a problem of considerable difficulty. Tomatoes suffer from the disadvantage that they tend to lose their color and flavor when dried. Furthermore, they tend to become very hygroscopic and either cake or form lumps. These factors have heretofore seriously impaired attempts to prepare dried tomatoes in a form such that they may be dispersed in water to form soups.

One of the objects of the present invention is to provide a new and improved type of dried tomato product which retains its original flavor and does not become hygroscopic so as to cake or form lumps which would interfere with the dispersion of the tomato in water for soup purposes.

Another object of the invention is to provide a new and improved process for producing a product of the character above described. Other objects will appear hereinafter.

In accomplishing these objects in accordance with this invention, it has been found that a new and improved type of tomato product can be obtained by drying either raw or cooked tomato juice in the presence of a finely divided, edible carbohydrate, preferably a grain flour and preferably in the presence of a stable, edible oil. A further preferred feature of the invention is to carry out the drying operation in the presence of a water soluble, edible salt of pectic acid, preferably sodium pectate. The dried product, therefore, may contain, in addition to the tomato, a finely divided, edible carbohydrate and a salt of pectic acid. A second form of the product may comprise, in addition to the tomato, the finely divided edible carbohydrate, a water soluble salt of pectic acid, and a small amount of an edible oil. Still another form of the product may comprise the dried tomato, the finely divided edible carbohydrate, and the edible oil. A fourth form of the product may consist of the dried tomato and the finely divided edible carbohydrate. Those products containing three or more of any of the components mentioned, including the dried tomato, appear to be superior to any of the other products, particularly in their non-caking characteristics.

In practicing the invention, it is preferable to carry out the drying operation quickly and for this purpose a spray drier of the type used in making powdered milk is preferably employed. The tomato juice, which may be either raw or cooked and normally will contain about 5% to 10% solids, is preferably first mixed in a colloid mill or homogenizer with the flour, starch or other finely divided edible carbohydrate, with or without the addition of the water soluble salt of pectic acid and/or a stable edible oil.

The mixture is then passed directly into a spray drier, for example, a drier of the Gray-Jensen type, such as is used in drying powdered milk. These driers normally operate at relatively high pressures, say, 5000 lbs. per square inch, and at temperatures above 200° F. The liquid is pumped into the drier and then passed into a cyclone separator in which the temperature is substantially lower. Inasmuch as the drier itself, due to the high pressures employed, also acts as a homogenizer, the step of pre-mixing the tomato juice with the various auxiliary components in a colloid mill, or other apparatus, is not always necessary.

In accordance with the invention, it has been found that the drying and separation of the product should be effected in such a way that there is an instantaneous drop in temperature, preferably over 100° F. from the drying zone of the upper part of the cyclone to the bottom of the cyclone separator, that is to say, for example, if the temperature of the air at the inlet (the so-called "wind box temperature") is 250° F., the temperature of the product taken off at the bottom of the cyclone is preferably not greater than 150° F. In order to facilitate cooling of the cyclone separator, it is sometibes desirable to run cold air, preferably de-humidified, into the cyclone, preferably tangentially and near the bottom thereof.

The invention will be further illustrated, but is not limited by the following examples in which the quantities are stated in parts by weight unless otherwise indicated.

*Example I*

To 112 lbs. of tomato juice there were added 11.7 lbs. of a solution of sodium pectate. The sodium pectate solution was prepared by dry mixing 5 lbs. of pectic acid with 1.15 lbs. of sodium carbonate, then adding water and allowing the mixture to effervesce. The solution was then brought to a boil with agitation, and the total weight adjusted to 88 lbs. by the addition of water. Of this solution, as previously indicated, 11.7 lbs. were employed.

This mixture was then pumped into a Gray-Jensen drier of the type used in making evaporated milk. The drier employed was a large sized commercial drier having a cyclone about 25 ft. high and the mixture was pumped through very rapidly, requiring about ½ minute from the time the mixture entered the pump until the dried product was obtained. The temperature of the wind box was around 250° F. The temperature of the cyclone measured at a point about 5 to 6 ft. from the bottom was around 165° F. to 170° F. The temperature of the product was around 120° F. to 130° F. In order to facilitate a rapid drop in temperature in the cyclone, a stream of cold air was forced tangentially into the cyclone about 2 ft. from the bottom, the temperature of the air being about 40° F. to about 45° F. so that the zone temperature at the point where the product was removed was not very much higher than the temperature of the product. A good product was obtained, although it exhibited some tendency to cake after standing over a long period of time.

When a test run was made which was the same except that the temperature of the wind box was 240° F. and the temperature of the cyclone about 5 to 6 ft. from the bottom around 170° F. and in which the product was recirculated through a second cooling cyclone, there was a pronounced caking of the product.

*Example II*

In this example the method of operation and procedure were the same as in Example I except that 1% of rice flour, based on the weight of the tomato juice, or 1.12 lbs., was added to the mixture of tomato juice and sodium pectate and the temperature of the wind box was raised to 265° F. to 270° F. In this example the temperature of the cyclone in a zone about 5 to 6 ft. from the bottom was around 175° F. A fine powdery product of excellent keeping qualities was obtained. This product did not tend to cake when allowed to stand over long periods of time.

*Example III*

In this example the procedure was the same as in Example II except that in addition to the tomato juice, rice flour and sodium pectate there was also added 0.9%, or about 1.008 lbs. of cocoanut oil. The resultant product was a very soft powder, even superior to the product of Example II. The temperature of the product as it came from the cyclone in both Examples II and III was around 120° F. to 130° F.

In a similar manner other dried tomato products may be prepared with different types of finely divided edible carbohydrate materials. Rice flour is preferred for the purpose of the invention because it apparently has the property of absorbing moisture. Among the other types of carbohydrate materials which may be employed are, for example, flours and starches such as those derived from corn, wheat, oats, barley, tapioca, sago, potato and sweet potato. The carbohydrate material employed is preferably one which is colloidal when dispersed in water or which gelatinizes and forms colloidal suspensions when heated in water. Thus, starches and flours will gelatinize and form colloidal suspensions when heated in water. The finely divided carbohydrate material serves to separate the tomato particles from each other and thereby reduces the normal tendency of the dried tomato to become hygroscopic and cake. Those carbohydrate materials containing a protein, such as rice flour, for example, are apparently superior to the pure starches for the purpose of the invention. Generally speaking, the hard particled flours are preferred.

The amount of the edible carbohydrate material employed is preferably within the range of about 0.5% to about 6%, based on the weight of a tomato juice containing about 6% solids. The amount of carbohydrate material in the final product preferably varies within the range from about 1% to about 50%. Thus, in the examples, the amount of carbohydrate material is between 15% and 20%, based on the weight of the final product.

Where an oil is employed, the amount thereof may also vary, but good results may be obtained by employing about $\frac{1}{10}$% to about 3% oil, and preferably about 1%, based on the weight of a tomato juice containing about 6% solids. Generally speaking, a clear neutral mineral oil is preferred, because such oils are very stable and do not become rancid. If vegetable oils are employed, the selection of an oil should be one which does not tend to become rancid easily, as, for example, cocoanut oil. The function of the oil is to coat and protect the fine tomato particles during drying in order to retain their flavor and prevent caking. The oil may be mixed with the tomato juice prior to the spray drying operation. The presence of an oil tends to produce a somewhat lighter product but of an excellent color for soup purposes.

As already pointed out, the instantaneous or very rapid cooling of the product from a relatively high temperature to a much lower temperature during the drying operation appears to be very important. Naturally the product cannot be heated to too high a temperature, because it will burn or scorch, but there is little danger of this as long as substantial amounts of water are present. Hence, the temperature in the cyclone is of primary importance and the temperature in that part of the cyclone from which the product is withdrawn is preferably not higher than 180° F. On the other hand, if the temperature in the upper part of the cyclone is too low, thorough drying will not take place, causing caking of the product. For this reason, it is preferable that the final zone through which the product is withdrawn have a temperature of 150° F., or above. It will be understood that the temperature of the product is somewhat lower, as previously pointed out, being around 120° F. to 130° F. when it is taken from the bottom of the cyclone.

As previously indicated, the water soluble pectate may be omitted, although it does seem to assist in reducing the hygroscopicity of the product, when employed in combination with a finely divided edible carbohydrate. Without the presence of the finely divided solid material, namely, the carbohydrate, an/or the oil, the water soluble pectate alone does not appear to give a product which will withstand caking over the periods of time necessary for commercial use. The products of Examples II and III, on the other hand, will retain their powdery form over a long period of time and may be dispersed readily and easily when heated in water to form a homogeneous soup mixture. The value of these products, therefore, lies particularly in that they may be stored and shipped and will retain their flavor and physical properties, including appearance, over long periods of time. Furthermore, they do not apparently tend to deteriorate or undergo chemical changes due to oxidation or other factors.

The present application is a continuation-in-part of my copending application Serial No. 383,551, filed March 15, 1941.

Having thus described the invention, what I claim as new and desire to secure by Letters Patent of the United States is:

1. The process of preparing dried tomato products which comprises quick drying and simultaneously finely dividing tomato juice containing about 5% to about 10% solids intimately dispersed with about 1% to about 50% of a finely divided gelatinized edible carbohydrate based on the weight of the tomato solids at a temperature above about 240° F. but below the temperature at which charring of the tomato begins to occur and then rapidly cooling the sprayed tomato product to a temperature of about 120° F. to about 130° F.

2. The process of preparing dried tomato products which comprises quick drying and simultaneously finely dividing tomato juice containing about 5% to about 10% solids intimately dispersed with about 1% to about 50% of a finely divided gelatinizable edible carbohydrate based on the weight of the tomato solids at a temperature above about 240° F. but below the temperature at which charring of the tomato begins to occur, and rapidly passing the product through a cooling zone at a temperature within the range from about 150° F. to 180° F.

3. The process of producing dried tomato products which comprises spray drying tomato juice at a temperature within the range of about 240° F. to 270° F. and then rapidly reducing the temperature by passing the sprayed product through a zone at a temperature within the range of about 150° F. to about 180° F.

4. The process of producing dried tomato products which comprises spray drying tomato juice at a temperature within the range of about 240° F. to about 270° F., passing the hot tomato juice spray through a cooling zone maintained at a temperature of 150° F. to 180° F. and then through a cooler zone in contact with a blast of moisture-free cold air.

5. The process of producing dried tomato products which comprises spray drying tomato juices at a temperature of above about 240 degrees F., but below the temperature at which charring of the tomato begins to occur, and then rapidly reducing the temperature by passing the sprayed product through a zone at a temperature within the range of 150 degrees to 180 degrees F.

6. The process of producing dried tomato products which comprises spray drying tomato juices at a temperature above about 240 degrees F., but below the temperature at which charring of the tomato begins to occur, passing the hot tomato juice spray through a cooling zone at a temperature within the range of 150 degrees F. to 180 degrees F., and then passing the product through a cooler zone while subjecting it to a blast of moisture-free cold air.

ELMER F. GLABE.